May 22, 1945.  T. N. HALL  2,376,537
ELECTRIC HOT WATER HEATER
Filed March 16, 1944  2 Sheets-Sheet 1

TUDOR.N.HALL
INVENTOR
BY
ATTORNEY

Patented May 22, 1945

2,376,537

UNITED STATES PATENT OFFICE 2,376,537

ELECTRIC HOT WATER HEATER

Tudor N. Hall, Highlands, N. C.

Application March 16, 1944, Serial No. 526,667

4 Claims. (Cl. 219—39)

This invention relates to electric hot water heaters and has for an object the provision of apparatus of the character designated which shall be simple of construction, easy of assembly, and adapted to conserve electric current and provide a prompt and constant supply of hot water.

A further object of my invention is to provide an electric hot water heater embodying one or more horizontally disposed heating units and which shall include means for inducing a thermo-syphonic flow of water being heated to the top of the tank through an insulated conduit without commingling with the other water in the tank.

A still further object of my invention is to provide an electric water heater which shall include improved means for insulating the tank and the chamber in which the water is heated to conserve heat and provide for a quicker response to a demand for hot water.

Another object of my invention is to provide, in an electric heater, a removable insulated chamber in which water is heated and through which a thermo-syphonic flow of water is induced, and an insulated conduit leading from the chamber to the upper end of the tank.

Figure 1:
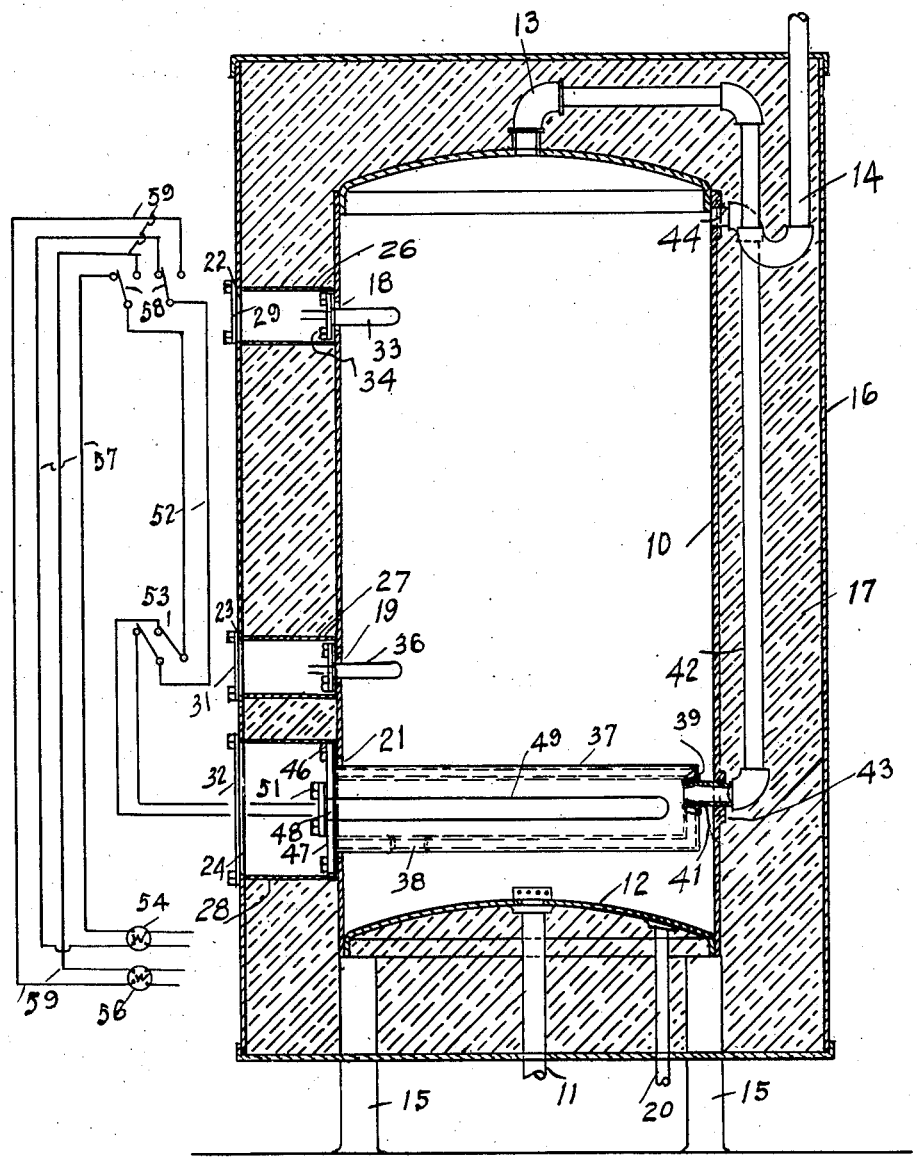
Figure 2:
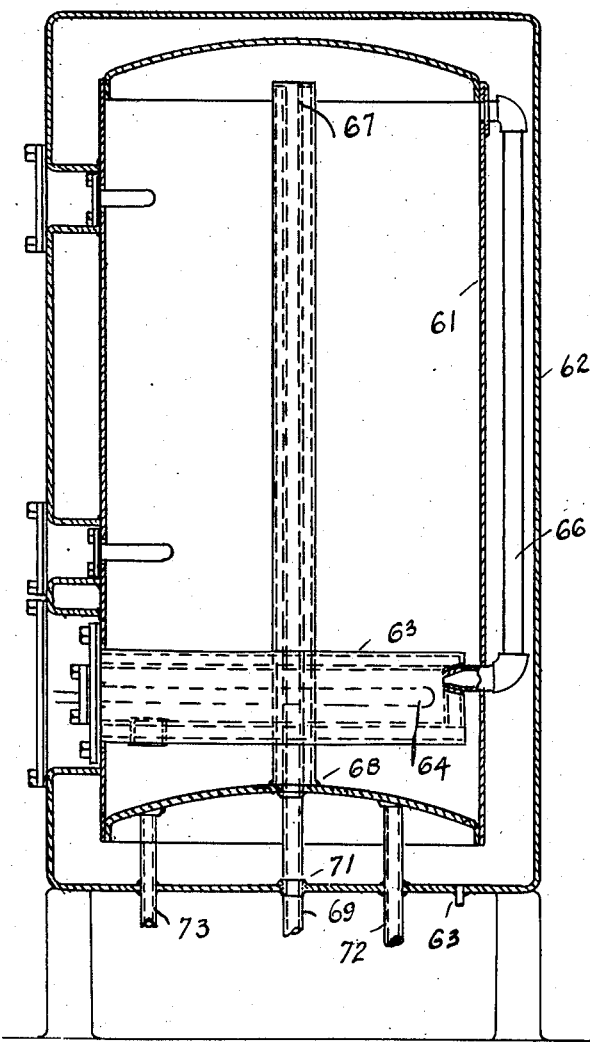

Apparatus embodying features of my invention is illustrated in the accompanying drawings forming a part of this application in which Fig. 1 is a vertical sectional view showing one form of my invention, including a wiring diagram; and Fig. 2 is a similar view showing a modified form thereof.

Referring to the drawings, I show a metal tank 10 adapted to withstand pressure. Connected to the bottom 12 of the tank is a cold water supply pipe from the city main or other source of supply under pressure. The pipe 11 is secured to the tank with a leak tight connection, as by welding. A hot water withdrawal pipe 13 is connected to the top of the tank and is provided at 14 with a downward bend to keep the heated water from backing up into the cold water system. The tank is supported by legs 15 joined to the bottom thereof. The entire tank is surrounded by an outer jacket 16 which is spaced from the tank and the space between the tank and the jacket is filled with a suitable insulating material 17 such as the well known rock wool or fiber glass. A drain pipe 20 connects to the bottom of the tank and extends through the jacket 16 at the bottom. At 18, 19 and 21 are openings leading into the tank and corresponding openings 22, 23 and 24 in the outer jacket 16 are connected to the openings in the tank by rings 26, 27 and 28 secured to both the tank and the outer casing and which give access to the openings in the tank. The openings 22, 23 and 24 are closed by removable plates 29, 31 and 32. Mounted in the upper opening 18 is a thermostat 33 which is secured in the opening by means of bolts 34. A similar thermostat 36 in the lower part of the tank is mounted in the opening 19 in a similar manner.

Mounted in the lowest opening 21 and extending horizontally across the tank toward the opposite side is a heating chamber 37. The heating chamber 37 is formed with spaced outer and inner walls, as shown, with a partial vacuum between the walls to prevent loss of heat therefrom. An opening 38 is provided in the under side of the heating chamber, near the connection to the side of the tank, through which cold water enters. At the outer end of the heating chamber is an outwardly flaring smooth opening 39 for the discharge of heated water therefrom. Fitting into the outwardly flared opening is a tapered nipple 41 on the end of a hot water discharge pipe 42 which extends through the wall of the tank 10 and is inserted in the opening 39. The pipe 42 is permanently joined to the side of the tank 10 with a leak tight joint as by welding, shown at 43. The pipe 42 extends upwardly in the space between the tank 10 and outer jacket 16 and re-enters the tank 10 at the top, being connected thereto by a leak tight connection as shown at 44. The heating chamber 37 is mounted in the opening 21 by means of bolts 46 so that it may be readily removed and replaced and its dimensions are such that its flared opening 39 fits snugly over the smooth nipple 41 when the heating chamber is mounted in place. The outer end of the chamber is formed by a plate 47 having an opening 48 therein in which is mounted an electric heating element 49 by means of bolts 51 which provide a leak tight connection. It will be seen that as water is heated by the heating element 49 it is discharged through the insulated pipe 42 and is carried to the upper end of the tank, thus providing a prompt supply of heater water which is not commingled with the cold water while on its way to the top. Also, the cold water opening 38, being remote from the discharge opening 39, the water is raised to a relatively high temperature before it is discharged.

Connected to the heating element 49 is an electric circuit 52. A switch 53 controls the circuit 52 and is operatively connected to the thermostat 36. The switch 53 is normally closed and is opened to interrupt the supply of electricity to the heating element only when the temperature of the water in the tank at the level of the thermostat 36 is raised above the setting of the thermostat 36. As is well known, in some communities, electric service in off peak load hours is sold at a lower rate than during peak load hours. In order that my improved water heater shall operate as economically as possible, I provide two watt hour meters through which current is supplied to the heating element circuit. One of these watt hour meters, shown at 54, is of the type controlled by a clock, not shown, which permits a supply of current to flow through the meter only during off peak load hours. The other watt hour meter 56 is adapted to supply current at all times when connection is made thereto. A circuit 57 leads from the meter 54 to a double throw switch 58 adapted to connect the circuit 57 to the circuit 52, and which is operatively connected to the thermostat 33. A circuit 59 leads from the meter 56 to the switch and is also adapted to be connected to the circuit 52 by said switch. Normally, the switch 58 is in the position shown in Fig. 1 to connect the clock controlled meter 54 with the circuit 52. If however, the hot water in the tank 10 should become nearly exhausted and the temperature thereof at the level of the thermostat 33 should fall below the setting of that thermostat, the switch 58 is actuated by the thermostat to connect the meter 56 with the circuit 52. It will thus be seen that electric current is supplied through the watt hour meter 56 only in case of emergency when there is a shortage of hot water in the tank 10. It will be understood that the wires forming the circuits just described may be arranged in any way, not shown, conveniently for installation.

Referring to Fig. 2, I show a modified form of my invention in which a tank 61 is surrounded by an outer metal casing 62 and the space between the casings is evacuated to provide a high vacuum between the two casings. At 63 I show a tube through the bottom of the casing through which air is depleted between the casing and the tank, the tube being sealed when the desired vacuum is attained. A heating chamber 63 similar to that shown in Fig. 1, is mounted in a similar manner as heretofore described. Mounted in the heating chamber 63 is a heating element 64 and hot water is discharged from the heating chamber through a pipe 66 which extends upwardly through the high vacuum space between the tank and the outer jacket 62 to re-enter the tank again at the top, as in the previous modification. Hot water is drawn from the tank through a double walled pipe 67, the walls being joined at the upper and lower ends and the space between the walls of the pipe being evacuated to prevent heat loss from the pipe. The pipe 67 extends downwardly through the tank, being connected to the bottom thereof at 68 and continuing therefrom as a single wall pipe 69 through the bottom of the outer jacket 62 where it is secured by welding as shown at 71. A cold water supply pipe 72 and a drain pipe 73 are similarly connected to the tank 61 and casing 62. In all other particulars, the construction of the apparatus shown in Fig. 2 is similar to that already described in connection with Fig. 1. This construction provides a heater with no unsightly pipe connections at front or back and all pipes leading to and from the heater may be concealed.

From the foregoing it will be seen that I have devised an improved electric hot water heater which is adapted to provide a prompt supply of heater water on demand and which includes a removable heating chamber which can be readily mounted in place and dismounted from the tank. It will also be seen that with my improved construction, there is a minimum of heat loss and substantially no heat loss from the water being heated to the cold water in the tank.

While I have shown my invention in but two forms, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In an electric hot water heater, a hot water tank, a horizontally disposed heating element in the tank, a heating chamber having double spaced walls with a partial vacuum between the walls surrounding the heating element, and detachably mounted in the side wall of the tank and having a bottom opening for cold water and a flaring opening through its walls at one end, a pipe fitting in the flaring opening with a slip fit and extending through the wall of the tank opposite the end of the chamber and thence upwards to re-enter the tank at the upper end thereof, and means to insulate the pipe outside the tank against heat loss.

2. In an electric hot water heater comprising a metal tank, a heating chamber detachably mounted in the wall of the tank near the lower end thereof and extending horizontally toward the other side of the tank, double spaced walls for the heating chamber, means defining a cold water inlet through the walls at the bottom of the chamber, means defining an outwardly flaring discharge opening through the walls of the chamber near the end thereof remote from its mounting in the side of the tank, a discharge pipe nipple having a smooth tapered end fitting into the flaring opening, and a heating element detachably mounted in the heating chamber.

3. In an electric hot water heater, a tank, a horizontally disposed heating chamber mounted in the side of the tank and extending across the tank toward the other side, said heating chamber having insulated walls and having a bottom opening for cold water and an inwardly tapering opening for the discharge of hot water in the end remote from its connection to the side of the tank, a heating element telescoping within the heating chamber and detachably mounted thereon, a conduit from the heating chamber to the top of the tank embodying a tapered nipple having a slip fit into the tapered opening of the heating chamber, and means to remove the heating chamber through the side wall of the tank and disconnect it from the nipple.

4. In an electric hot water heater embodying a metal tank, a horizontally disposed heating chamber mounted in one side near the lower end of the tank and projecting toward the other side, a heating element telescoping within the heating chamber and secured thereto, means defining a cold water inlet through the bottom of the chamber near the end mounted on the side of the tank, means defining an outwardly flaring smooth discharge opening at the end of the chamber opposite the other side of the tank, a hot water circulating pipe extending through the other side of the tank and having a smooth tapered end with a slip fit into the flaring opening, said conduit extending upwardly and re-entering the tank at the upper end thereof, an outer jacket for the tank spaced therefrom, and means to minimize heat loss from the tank through the outer jacket, and detachable mounting means for the heating chamber, whereby it may be removed and detached from the hot water circulating pipe.

TUDOR N. HALL.